(12) United States Patent
Wentz et al.

(10) Patent No.: US 9,204,597 B2
(45) Date of Patent: Dec. 8, 2015

(54) BALE SHREDDER

(71) Applicants: Ethen D. Wentz, Menno, SD (US);
Walter R. Fair, Jr., Menno, SD (US)

(72) Inventors: Ethen D. Wentz, Menno, SD (US);
Walter R. Fair, Jr., Menno, SD (US)

(73) Assignee: Ethan D. Wentz, Menno, SD (US)

( * ) Notice: Subject to any disclaimer, the term of this patent is extended or adjusted under 35 U.S.C. 154(b) by 0 days.

(21) Appl. No.: 14/480,224

(22) Filed: Sep. 8, 2014

(65) Prior Publication Data
US 2014/0374521 A1    Dec. 25, 2014

Related U.S. Application Data

(62) Division of application No. 14/048,108, filed on Oct. 8, 2013, now Pat. No. 9,027,863.

(60) Provisional application No. 61/818,011, filed on May 1, 2013.

(51) Int. Cl.
| | |
|---|---|
| *A01F 29/00* | (2006.01) |
| *B02C 18/22* | (2006.01) |
| *A01F 29/01* | (2006.01) |
| *A01D 87/12* | (2006.01) |

(52) U.S. Cl.
CPC .............. *A01F 29/005* (2013.01); *A01F 29/01* (2013.01); *B02C 18/22* (2013.01); *A01D 87/127* (2013.01); *A01D 2087/128* (2013.01); *Y10S 241/605* (2013.01)

(58) Field of Classification Search
CPC ........... A01D 2087/128; A01D 87/127; B02C 18/067; B02C 13/286; B02C 18/22; A01F 29/005; A01F 29/01; Y10S 241/605

USPC ....................... 241/189.1, 186.35, 186.4, 605
See application file for complete search history.

(56) References Cited

U.S. PATENT DOCUMENTS

| | | |
|---|---|---|
| 3,966,128 A | 6/1976 | Anderson |
| 4,449,672 A | 5/1984 | Morlock |

(Continued)

FOREIGN PATENT DOCUMENTS

WO           9403043        2/1994

OTHER PUBLICATIONS

Haybuster 2564 Balebuster, Brochure, pp. 1-4, DuraTech Industries, Feb. 2011.

(Continued)

*Primary Examiner* — Faye Francis
*Assistant Examiner* — Onekki Jolly
(74) *Attorney, Agent, or Firm* — Jeffrey A. Proehl; Woods, Fuller, Shultz & Smith, PC

(57) ABSTRACT

A bale shredder apparatus may comprise a frame and a bale hopper mounted on the frame and defining an interior bale chamber for receiving a bale to be shredded with a bale feed opening. A bale shredding assembly may be in communication with the bale chamber through the opening to shred a bale in the bale chamber. A side wall of the hopper may be movable away from the primary side wall to permit removal of a bale from the bale chamber. A primary bale movement assembly may move a bale in a lateral direction toward the opening and a secondary bale movement assembly may move the bale in a direction substantially transverse to the lateral direction. A shredding rotor of the shredding assembly may include at least one brace including at least one leg extending outwardly from the outer surface of the rotor.

17 Claims, 9 Drawing Sheets

(56) References Cited

U.S. PATENT DOCUMENTS

| | | |
|---|---|---|
| 5,090,360 A | 2/1992 | Shiba |
| 5,090,630 A | 2/1992 | Kopecky |
| 5,209,413 A | 5/1993 | Dwyer |
| 5,573,190 A | 11/1996 | Goossen |
| 5,653,394 A | 8/1997 | Bussiere |
| 5,865,589 A * | 2/1999 | Reyher et al. ................ 414/412 |
| 6,517,019 B2 | 2/2003 | Johnson |
| 6,550,704 B2 | 4/2003 | Johnson |
| 6,886,763 B2 | 5/2005 | Lepage |
| 6,966,512 B1 | 11/2005 | Simpson |
| 7,055,425 B2 | 6/2006 | Viaud |
| 7,337,603 B2 | 3/2008 | Johnson |
| 7,566,019 B1 | 7/2009 | Dueck |
| 7,651,043 B2 | 1/2010 | Hoovestol |
| 7,793,873 B2 | 9/2010 | Hoovestol |
| 7,815,136 B2 | 10/2010 | Arnston |
| 8,066,208 B2 | 11/2011 | Bennett |
| 2005/0017108 A1 * | 1/2005 | Helmeczi et al. ............. 241/194 |
| 2012/0233962 A1 | 9/2012 | Bennett |

OTHER PUBLICATIONS

Haybuster 2100 Balebuster, Brochure, pp. 1-4, DuraTech Industries, Jan. 2005.

Roto-Slicer Processor, Operation & Service Manual, pp. 1-29, DewEze Manufacturing, Publication #600001, Mar. 2002.

Super Slicer II Brochure, DewEze Manufacturing, p. 13.

Roto-Cut Processor, Operation & Service Manual, pp. 1-29, DewEze Manufacturing, Publication #400001, Jul. 2001.

Haybuster 2800 Balebuster, Brochure, pp. 1-2, DuraTech Industries, Feb. 2005.

Haybuster 2650 Balebuster, Brochure, pp. 1-6, DuraTech Industries, Jul. 2005.

Haybuster 2655 Balebuster, Brochure, pp. 1-2, DuraTech Industries, Jul. 2009.

Haybuster 2564 Balebuster product information, webpage, www.haybuster.com/hb/bb2564.html, download date Apr. 8, 2013.

* cited by examiner

BALE SHREDDER

REFERENCE TO RELATED APPLICATIONS

This application claims the priority of U.S. Provisional Application No. 61/818,011, filed May 1, 2013, the entirety of which is hereby incorporated by reference.

BACKGROUND

Field

The present disclosure relates to bale shredding apparatus and more particularly pertains to a new bale shredder for more efficiently shredding bales, especially bales with anomalies that may cause difficulties for shredding the bale.

SUMMARY

In one aspect, the present disclosure relates to a bale shredder with a bale hopper configured to receive a bale to be shredded and having a perimeter formed of walls. The perimeter may include a front wall, a rear wall, a primary side wall and a secondary side wall. In some embodiments, the secondary side wall may be movable to provide access to the interior of the bale hopper to remove a bale situated therein. The bale shredder may also include a bale lift assembly configured to lift a bale into the bale chamber, and the bale lift assembly may be structured so that an actuator is able to pivot both a fork as well as move the rear wall. The bale shredder may include a bale shredding assembly configured to shred a bale positioned in the bale chamber and that includes a shredding rotor positioned to shred a bale in the bale chamber of the bale hopper. In some embodiments, the rotor may include at least one brace positioned on the surface of the rotor that may effectively create separation between the rotor surface and twine that becomes wrapped about the rotor to facilitate cutting of the twine. In some embodiments, the rotor includes at least one string blocking member that may effectively block migration of string along the rotor to supporting bearings. The bale shredder may also include a primary bale movement assembly configured to move a bale in the bale chamber toward the shredding rotor. In some embodiments, the bale shredder may also include a secondary bale movement assembly that may move a bale in the bale chamber in a direction that is generally transverse to a direction that the bale is moved by the primary bale movement assembly.

In another aspect, the disclosure relates to a bale shredder apparatus that may comprise a frame having a front and a rear with a longitudinal axis generally extending from the front to the rear and generally aligning with a direction of movement of the frame when being towed across a ground surface, and the frame may have lateral sides. The apparatus may further comprise a bale hopper mounted on the frame and defining an interior bale chamber for receiving a bale to be shredded, the bale hopper having an upper opening into the bale chamber and a chamber bottom generally positioned opposite of the upper opening. The bale hopper may comprise a perimeter formed of walls, and the perimeter may include a front wall positioned toward the front of the frame, a primary side wall on one lateral side of the bale chamber and extending generally rearwardly from the front wall, and a secondary side wall positioned on an opposite lateral side of the bale chamber from the primary side wall and extending generally rearwardly from the front wall. A bale feed opening may be positioned in the primary side wall. The apparatus may comprise a bale shredding assembly in communication with the interior bale chamber through the bale feed opening to shred a bale positioned in the bale chamber. The secondary side wall may be movable away from the primary side wall to permit removal of a bale from the bale chamber.

In still another aspect, the disclosure relates to a bale shredder apparatus that may comprise a frame having a front and a rear with a longitudinal direction generally extending from the front to the rear and generally aligning with a direction of movement of the frame when being towed across a ground surface. The frame has lateral sides with a lateral direction extending from one lateral side to the other lateral side. The apparatus may also comprise a bale hopper mounted on the frame and defining an interior bale chamber for receiving a bale to be shredded. The bale hopper may have an upper opening into the bale chamber and a chamber bottom generally positioned opposite of the upper opening, and a floor positioned toward the chamber bottom with an upper surface. A bale feed opening may be positioned generally laterally adjacent to the floor. The apparatus may also include a bale shredding assembly in communication with the interior bale chamber through the bale feed opening to shred a bale positioned in the bale chamber. A primary bale movement assembly may be configured to move a bale in the bale chamber over the upper surface of the floor in the lateral direction toward the bale feed opening and the bale shredding apparatus, and a secondary bale movement assembly may be configured to move a bale in the bale chamber over the upper surface of the floor in a direction substantially transverse to the lateral direction that the primary bale movement assembly moves the bale.

In yet another aspect, the disclosure relates to a bale shredder apparatus that may comprise a frame having a front and a rear with a longitudinal axis generally extending from the front to the rear and generally aligning with a direction of movement of the frame when being towed across a ground surface, and the frame has lateral sides. The apparatus may also comprise a bale hopper mounted on the frame and defining an interior bale chamber for receiving a bale to be shredded, with the bale hopper having an upper opening into the bale chamber and a chamber bottom generally positioned opposite of the upper opening. The bale hopper may comprise a perimeter formed of walls, and a bale feed opening being positioned in the one of the walls. The apparatus may include a bale shredding assembly to shred a bale positioned in the bale chamber, and the bale shredding assembly may include a shredding rotor positioned adjacent to the bale feed opening to contact a bale in the bale chamber. The rotor may be rotatable about a rotation axis, and may have a rotor wall with an outer surface and a plurality of flails extendable outwardly from the outer surface. The shredding rotor may include at least one brace positioned on the outer surface of the rotor wall and extending generally parallel to the rotation axis, the brace including at least one leg extending outwardly from the outer surface of the rotor.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
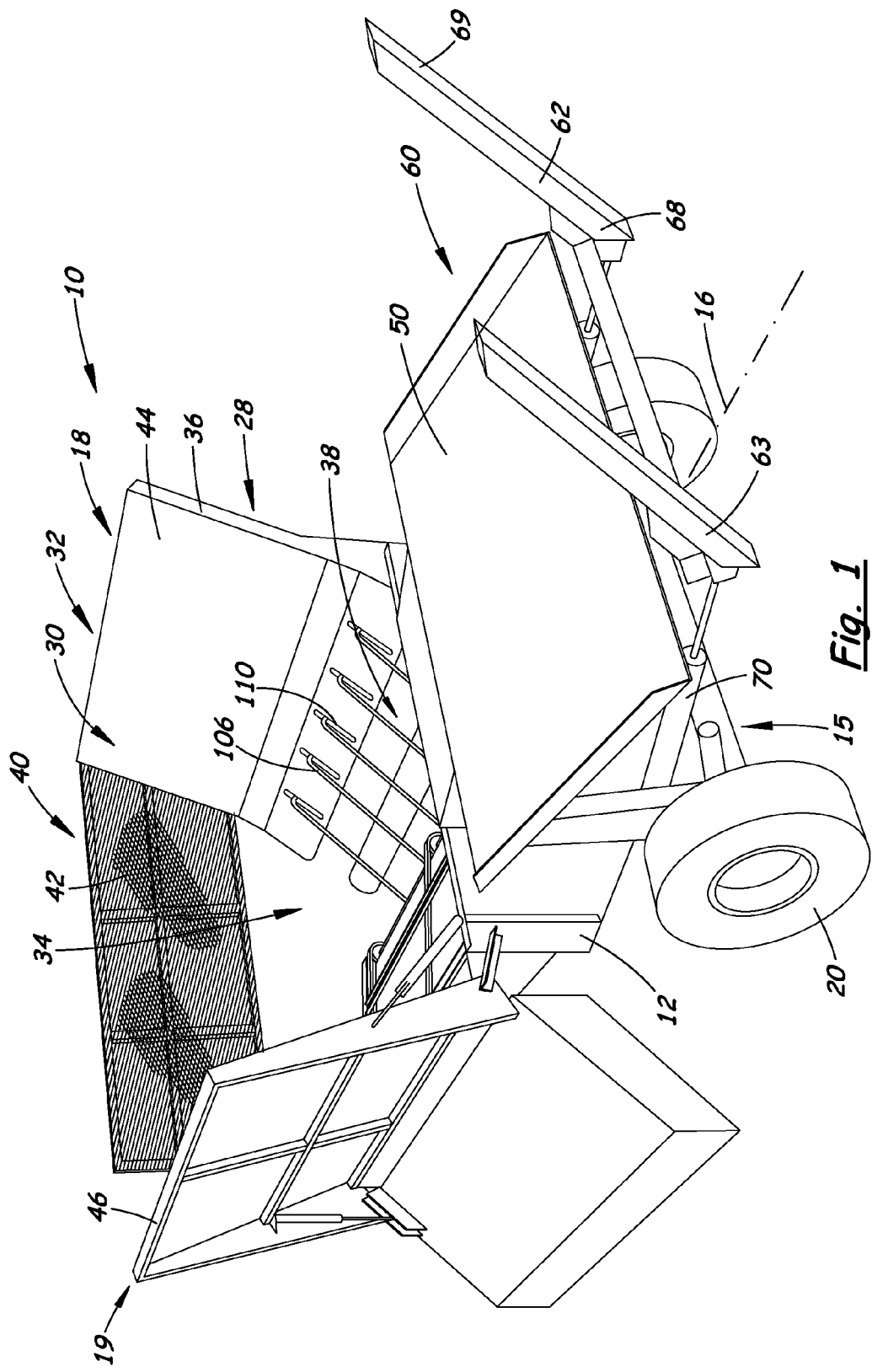
FIG. 1 is a schematic perspective view of a new bale shredder according to the present disclosure.

With reference now to the drawings, and in particular to FIGS. 1 through 8 thereof, a new bale shredder embodying the principles and concepts of the disclosed subject matter will be described.

In general, many bale shredders utilize a shredding rotor with flails mounted at various locations on the rotor that strike a portion of a bale positioned in the bale shredder when the rotor is rotated Applicants have recognized that a substantially cylindrical bale placed in conventional bale shredders may develop annular grooves and ridges in the outer surface of the bale that prevent the bale from being completely shredded. Applicants have determined that the problem is caused by bars that extend over an opening through which that flails on the shredding rotor contact and tear material away from the bale. The presence of the bars prevent the flails from contacting the bale surface at certain regions of the bale, and the flails are only able to dig into the bale at regions that are between and thus not aligned with these bars. A series of outwardly extending ridges may then form on the outer surface of the bale in those regions where the bars contact the bale, while the flails cut grooves into the bale between these ridges. At some point the flails are no longer able to reach the material of the bale between the bars and corresponding ridges, and material can no longer be effectively removed from the bale. Typically, this results in the user having to remove the bale from the hopper using another machine such as a loader. Removal of a partial bale from a hopper is difficult an can be dangerous to personnel, particularly if a person has to enter the hopper to secure the bale to the machine used to remove the bale.

Applicants have developed an apparatus for a bale shredder that not only moves the bale in a primary direction toward the rotor and flails, but also moves the bale in a direction that is substantially transverse to the primary direction of movement. This transverse movement (which may be an oscillatory movement) in addition to the movement in the primary direction tends to reduce if not eliminate the formation of the ridges by disrupting any alignment continuing alignment between a location on the surface of the bale and the bars so that ridges cannot form and hold the surface of the bale away from the flails. The bale may thereby be more effectively shredded.

Applicants have also recognized that in conventional bale shredder designs, it may be exceedingly difficult to retrieve a bale from the bale chamber once it has been loaded in the chamber if it becomes desirable to remove the bale. The operator may desire to remove the bale after the shredding process has begun if, for example, it becomes apparent there is mold in the bale and it is not suitable for use as feed, or if the bale has become wet and frozen, and therefore cannot be readily shredded. Often the conditions making the bale unsuitable go unnoticed until a significant portion of the bale has been bale has been removed. Additionally, there are instances where the bale needs to be removed not because of any defect in the bale, but simply because, for example, the rest of a bale is not needed at the time or a bale of a different feed material is needed for a different purpose (e.g., feed versus bedding material). Conventional bin chamber design on bale shredders requires that the bale be lifted up out of the hopper using a loader or other means of lifting. This operation needs to be conducted over the hopper walls or over loading apparatus, which can be a very difficult operation especially under field conditions, particularly where the user needs to enter the interior of the hopper. Applicants have developed a movable wall that forms one side of the bale hopper that can be opened to allow simplified access to the bale chamber in the interior of the hopper without having to use a machine to reach over one of the walls and into the hopper interior to retrieve the bale. In some circumstances, the bale may be ejected from the hopper by moving the wall to an open condition and reversing the operation of the means that normally moves the bale towards the bale shredder, which may obviate the need to use any additional machinery to remove the bale from the hopper.

Typically the bales to be shredded are wrapped in twine or string, and applicants have recognized that in shredding the bale, the twine of the bale becomes wrapped around the shredding rotor and can cause significant problems. One significant problem is that the twine accumulates on the shredding rotor and tends to migrate or spread along the length of the rotor, and eventually the twine reaches the end of the rotor and the bearing supporting the end of the rotor, and contacts the seal of the bearing. This contact often compromises the seal and destroys the bearing. Typically, the bearing is mounted beyond a wall through which the rotor passes, and the conventional approach has been to position a collar or plate on the wall with a hole that has a close fit with the exterior surface of the rotor. Applicants have recognized that this approach has not been successful in stopping the migration of the twine past the collar and into the bearing, and the bearing is still often damaged. Applicants have developed a structure that is more effective at stopping the twine migration and protecting the bearing, and in some embodiments comprises a flange that is mounted on the rotor to rotate with the rotor.

Even if the twine is prevented from reaching and compromising the bearings, the twine still accumulates on the rotor and can interfere with, for example, the operation of the flails. Applicants have recognized the difficulty in removing the twine from the shredding rotor due to the typical tight wrapping of the twine on the rotor and the resulting closeness of the twine to the outer surface of the rotor. This characteristic makes it difficult to use a knife or other sharp object to cut the twine away from the rotor. For example, the outer surface of the shaft is cylindrical and it is difficult to cut the twine away because the knife has to be moved along the outer surface of the shaft, and thus only the point of the knife is in contact with the twine tightly wrapped about the rotor. The tip of the knife quickly becomes dull, and the paint or finish on the rotor may be damaged by pressing the knife tip against the rotor.

Applicants have devised a structure that facilitates the cutting of the twine away from the rotor, and which also may reinforce the connection of the flails to the rotor and further may reinforce the rotor structure such that lighter gauge materials may be employed. Applicants' structure may include at least one, and preferably more, than one elongate elements positioned along the exterior of the shredding rotor. The presence of these elements tends to create separation or a space between the twine wrapped around the rotor and the surface of the rotor, and into this gap the user can position a knife blade and obtain more effective contact with the twine that is not simply limited to the tip of the blade.

Applicants have also recognized that in conventional bale shredder designs the apparatus for moving the bale toward the shredding rotor may not be as effective as possible, in particular when the bale is hard on the outer surface, such as when the bale has some ice formed on the outer surface so that the apparatus does not effectively grip the outer surface of the bale. Applicants have recognized that an endless chain and slat apparatus of conventional design may not provide sufficient "bite" into the surface of the bale, and that the bale may tend to ride solely on the slats and the slats may slide across the lowermost surface of the bale. Applicants have realized that the typical close spacing between the slats may cause this lack of bite and the slipping of the bale across the slats, and that using a greater spacing between the slats than was heretofore utilized facilitates a greater degree of bite and allows the bale to fall into the spaces between the slats and reduces the ability of the bale to slip on the slats without advancing toward the shredding rotor.

The disclosure generally relates to a bale shredder 10 with a plurality of advantageous features that may be used individually or in combination to provide bale shredding functionality that handles normal bales as well as bales that have anomalies that would cause problems in shredding for known bale shredding machinery.

Generally, the bale shredder 10 includes a frame 12 which may have a front 14 and a rear 15 with a longitudinal axis 16 extending from the front to the rear and generally aligning with a direction of movement of frame when being towed. The front 14 is generally oriented in the primary direction of movement when the shredder 10 is being towed, and the rear 15 is generally oriented away from the direction of towed movement. The frame 12 may also have lateral sides 18, 19. The frame 12 may be supported above a ground surface by a pair of wheels 20, although the use of wheels is not critical to the invention, and the wheels may be mounted on an axle. The frame 12 may include a hitch portion 22 for connecting the frame to a towing vehicle. The hitch portion 22 may include suitable hitch structure that is suitable for the particular type of towing vehicle. The bale shredder 10 may also include a power take off coupling assembly 24 for coupling to a power take off of the towing vehicle. The power take off coupling assembly may include a coupling shaft 26 that extends forwardly adjacent to the hitch portion of the frame and has a forward end that is configured to be coupled to the power take off apparatus of the towing vehicle. It should be recognized that the various components of the bale shredder 10 that require power may be operated by mechanical, fluid, or electrical power supplied by the towing vehicle, or power may be supplied by means onboard the shredder 10.

The bale shredder 10 has a bale hopper 28 that may be configured to receive a bale to be shredded and hold the bale as it is shredded. The bale hopper 28 may define an interior bale chamber 30 into which the bale is inserted for shredding. The bale hopper may have an upper opening 32 into the bale chamber and a chamber bottom 34 positioned opposite of the upper opening. In general, a bale may be moved through the upper opening 32 into the bale chamber 30 to rest on the bottom 34. The bale hopper 28 may comprise a perimeter 36 formed of walls, and a bale feed opening 38 may be formed by the perimeter. The perimeter 36 may include a front wall 40 positioned toward the front of the frame, and the front wall may have a reticulated portion 42 to facilitate viewing through the front wall from a towing vehicle to see into the bale chamber 30. The perimeter may also include a primary side wall 44 that may extend rearwardly from the front wall 40, and the bale feed opening may be positioned in the primary side wall with the major portion of the primary side wall extending down to the bale feed opening.

The perimeter 36 may include a secondary side wall 46 that may extend rearwardly from the front wall 40 and may be positioned opposite of the primary side wall on an opposite side of the bale chamber. In some embodiments, the secondary side wall 46 may be movable to facilitate removal of a bale from the bale chamber after the bale has been placed in the chamber.

Illustratively, the secondary side wall 46 is pivotable about a substantially vertical axis, and the pivot 48 may be located toward a forward end of the secondary side wall and may be pivotally mounted on the front wall 40. The secondary side wall 46 may be movable between a closed position (see the solid lines in FIG. 2) and an open position (see the broken lines in FIG. 2). The closed position may be characterized by the secondary side wall being oriented substantially parallel to the primary side wall, and the open position may be characterized by the secondary side wall being pivoted out of the closed position and away from the primary side wall. In the open position, the secondary side wall may no longer be able to form a portion of the hopper as it does in the closed position. In some embodiments, the movement of the secondary side wall into the open position may allow a bale to be moved or ejected from the interior bale chamber by reversal of the primary bale movement assembly without the user having to move into the bale chamber. A latch may be provided to latch or secure the secondary side wall in the closed position. Those skilled in the art will recognize that other structures for making the secondary side wall movable may be utilized.

A rear wall 50 may form a further portion of the perimeter 36 and may be generally positioned substantially opposite of the front wall 40. The rear wall 50 may be movable to open the rear of the perimeter for bale loading, and may be movable between a load position (see FIG. 7A) and a dump position (see FIG. 7D). The load position of the rear wall 50 may be characterized by the rear wall extending rearwardly from the frame, and the rear wall may extend downwardly from the frame. The dump position of the rear wall may be characterized by the wall 50 extending upwardly from the frame. To provide the movement, the rear wall may be pivotable away from the side walls about a substantially horizontal axis, and may be pivotally mounted on the frame.

The bale hopper 28 may further include a floor 52 positioned toward a bottom of the bale chamber with an upper surface 54. The upper surface 54 of the floor may have a first side 56 located toward the secondary side wall 46 and a second side 58 located toward the bale feed opening 38 and the primary side wall 44.

The bale shredder 10 may further include a bale lift assembly 60 that is configured to lift a bale into the bale chamber, such as from the ground surface. The bale lift assembly 60 may have a first position (see FIG. 7A) in which the lift assembly 60 is located adjacent to the ground surface and a second position (see FIG. 7D) in which the assembly 60 located toward the bale chamber. The bale lift assembly 60 may be positioned toward and mounted on the rear of the frame.

The bale lift assembly 60 may comprise a pair of forks 62, 63 that extend rearwardly from the rear wall 50. The forks 62, 63 may be mounted on the rear wall 50, and may be pivotally mounted on the wall 50. The forks may pivot on a pivot mount 64 that includes a first pivot component 66 mounted on the rear wall and a second pivot component 67 mounted on the respective fork. Each of the forks has an inboard end 68 and an outboard end 69, and the second pivot component 69 may be positioned on the forks at a location spaced from the inboard end 68 and may be closer to the inboard end than the outboard end. The bale lift assembly 60 may further comprise a fork actuator 70 that is configured to move a respective fork, and may further be configured to move the rear wall 50 between the load position and the dump position. The fork actuator may be mounted on the frame 12 and also on the rear wall 50 via a connection link 72, and may be extendable and retractable to move the forks as well as the rear wall.

Figure 7A:
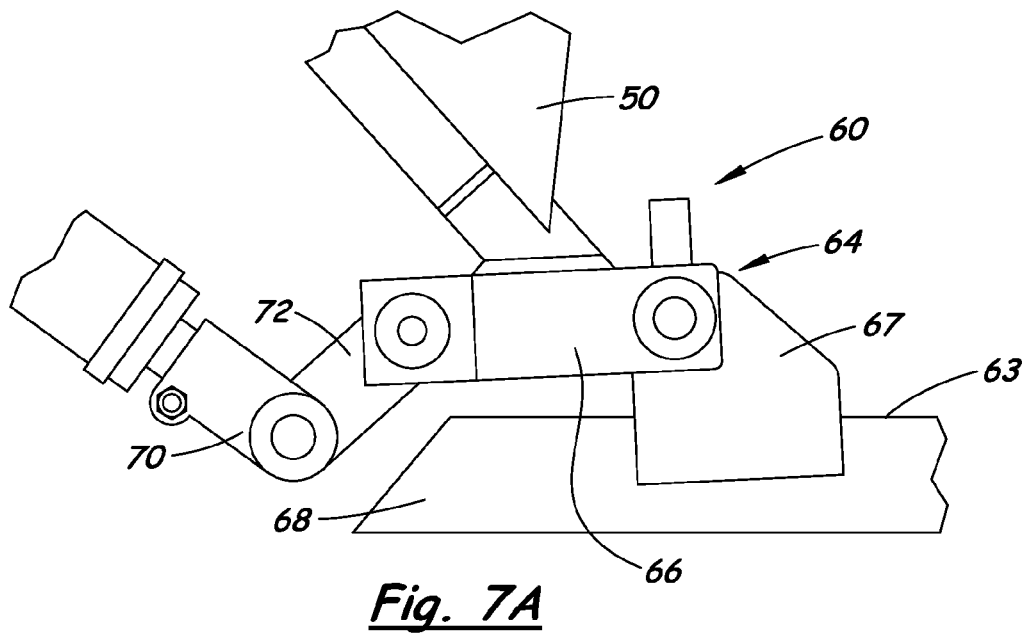
FIG. 7A is a schematic side view of a portion of the bale lift assembly showing one of the forks freely resting on the ground without interaction with the actuator at a substantially retracted condition of the actuator.
Figure 7B:
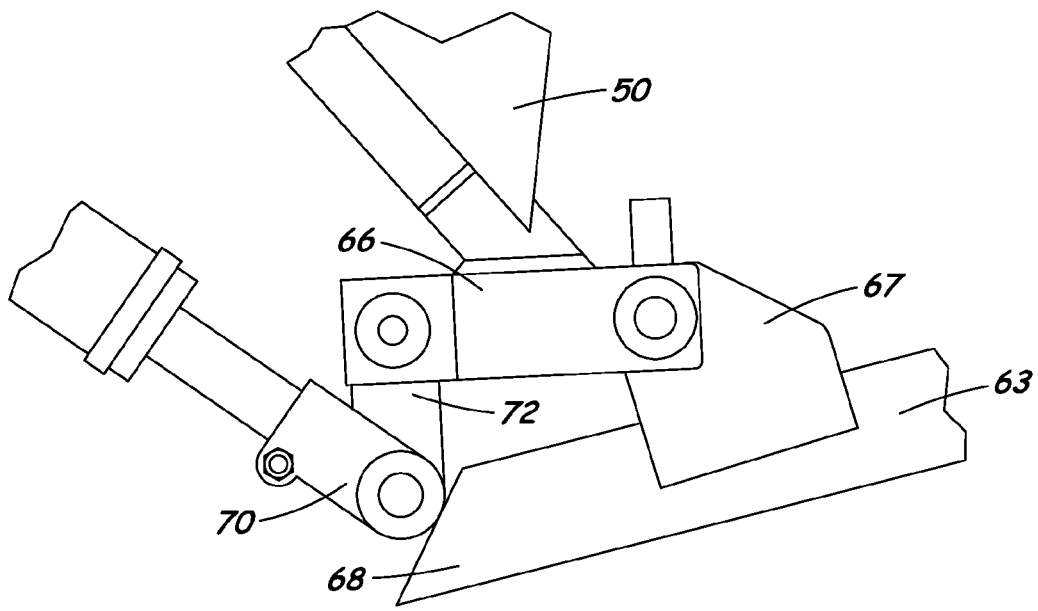
FIG. 7B is a schematic side view of the portion of the bale lift assembly showing the actuator at a first stage of extension in which the actuator contacts the fork to pivot the fork upwardly prior to the rear wall being moved.
Figure 7C:
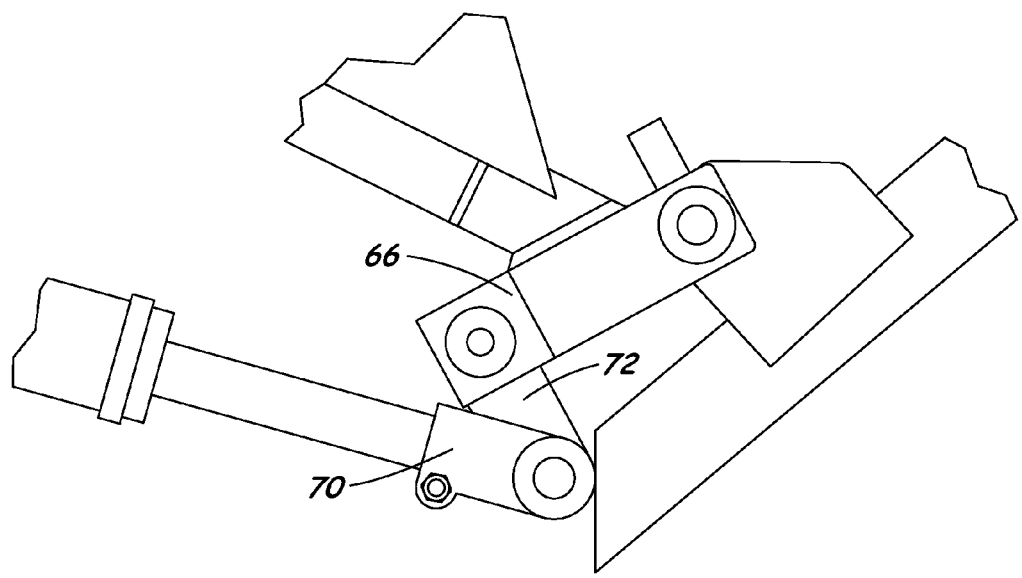
FIG. 7C is a schematic side view of the portion of the bale lift assembly showing the actuator at a third stage of extension in which the fork and the rear wall are being pivoted by the actuator.
Figure 7D:
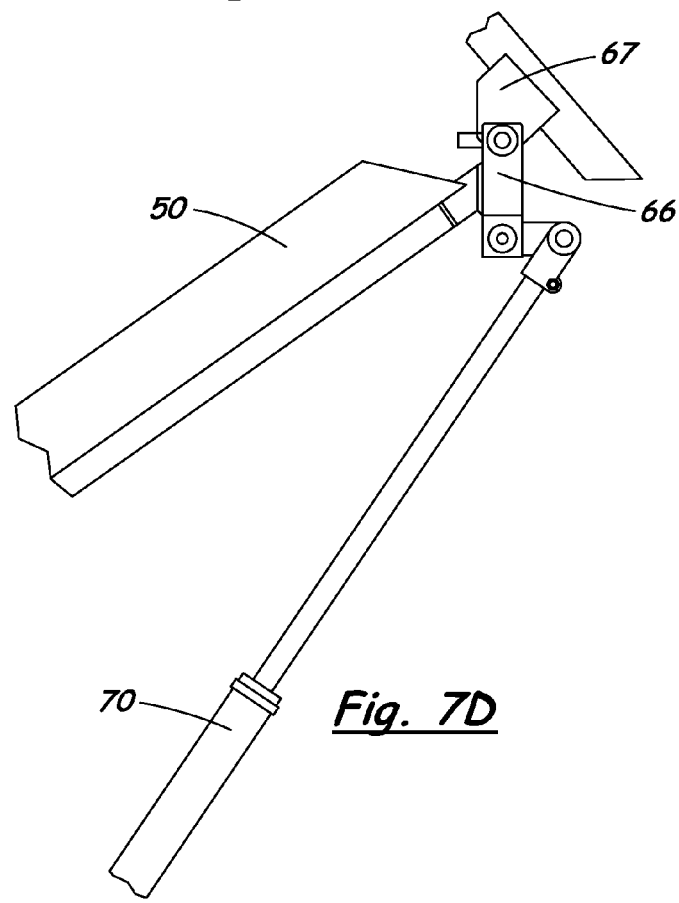
FIG. 7D is a schematic side view of the portion of the bale lift assembly showing the actuator at a fourth stage of extension in which the rear wall is substantially fully raised.
Figure 8:
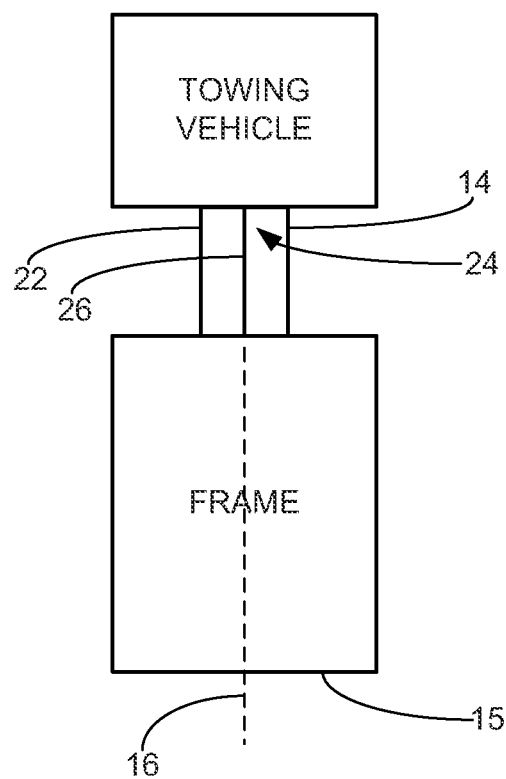
FIG. 8 is a schematic block diagram of aspects of a system including the towing vehicle and bale shredder.

In some embodiments, when the forks are resting on the ground surface, the actuator 70 may be linked by the connection link 72 to the wall, but may be free of contact with the fork so that fork is free to pivot on the pivot mount 64 to orient itself substantially parallel to the ground surface without the actuator having to be adjusted to a particular degree of extension (see FIG. 7A). As the actuator begins to be extended, then the end of the actuator 70 may press or push against the inboard end 68 of the fork and tend to pivot the outboard end 69 of the fork off of the ground to help roll a bale on the forks back toward the rear wall (see FIG. 7B). As the actuator continues to be extended, the fork continues to roll backward to a limit, and then the connector link 72 may reach the limit of its ability to pivot (such as by contacting the wall 50), and the extension movement of the actuator tends to lift the wall 50 upwardly away from the ground surface (see FIG. 7C). Continuing to extend the actuator may move the rear wall 50 to the raised position (see FIG. 7D). By this configuration, the same actuator may be utilized to rotate the forks into a roll back position as well as move the rear wall into a raised (and lowered) position.

Figure 2:
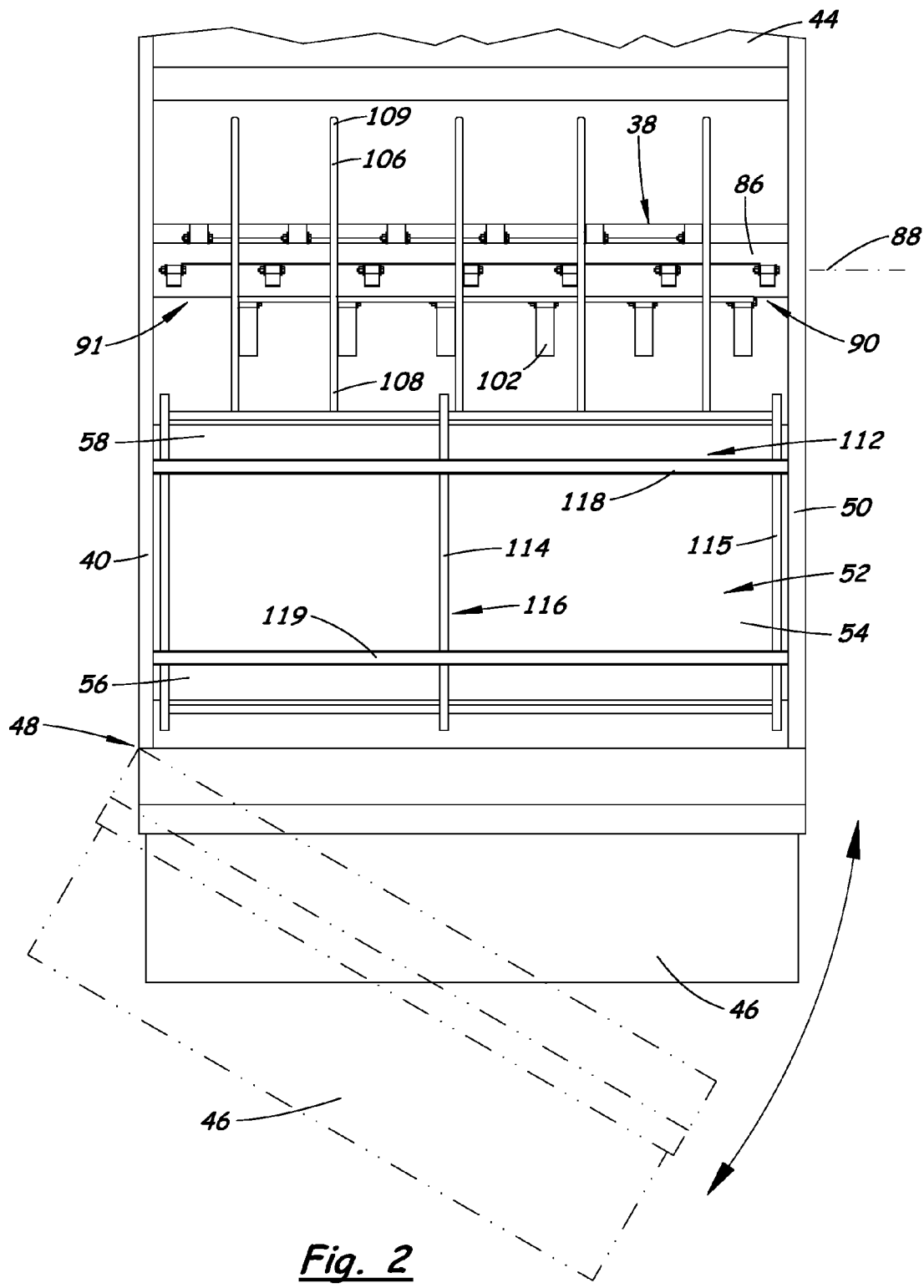
FIG. 2 is a schematic top view of the bale shredder, according to an illustrative embodiment, with the secondary side wall shown in a closed position in solid lines and in an open position in broken lines.
Figure 3:
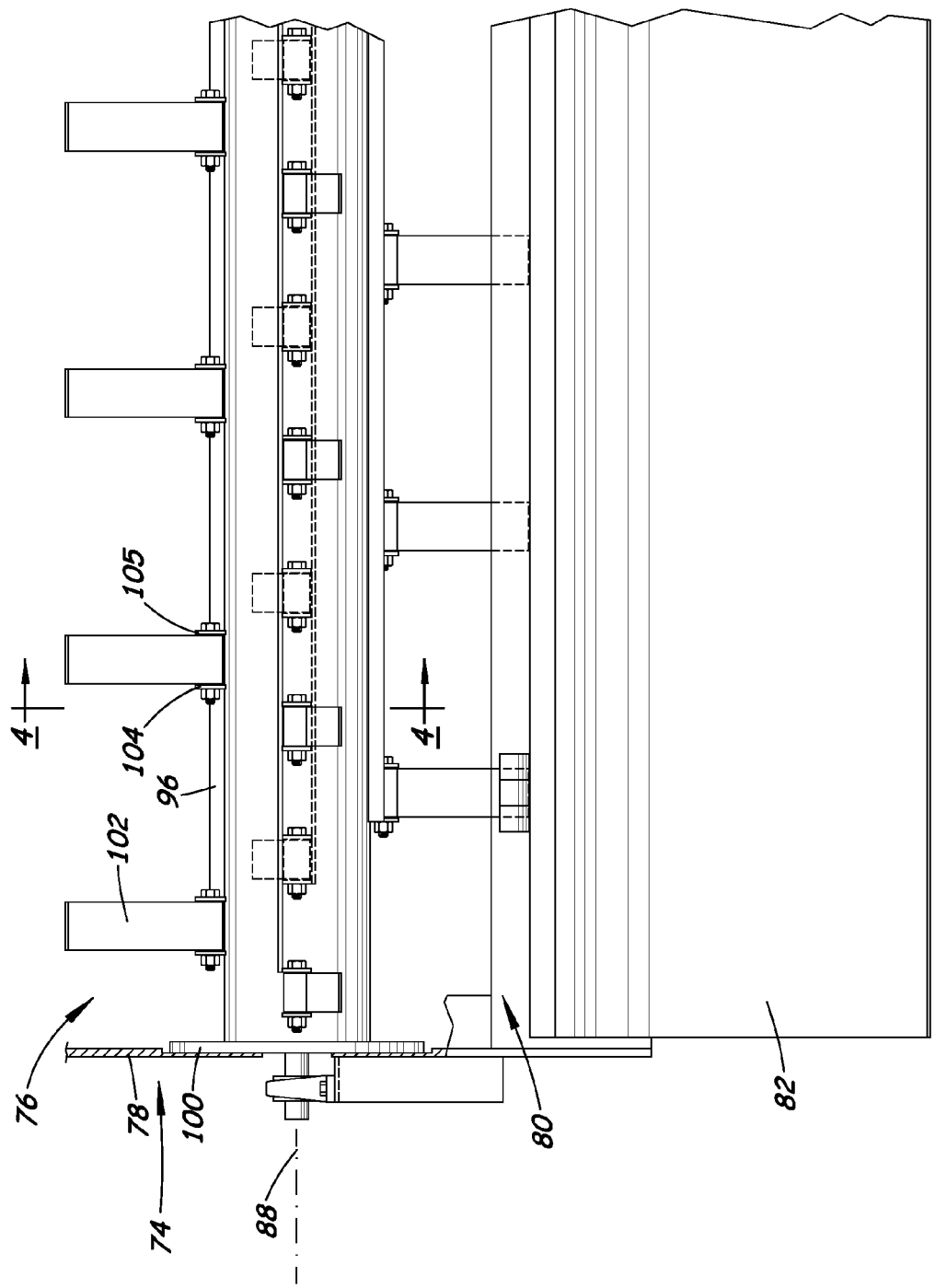
FIG. 3 is a schematic side view of the bale shredding assembly of the bale shredder with the cover panel of the rotor chamber in an open position to show detail of the shredding rotor, according to an illustrative embodiment.
Figure 4:
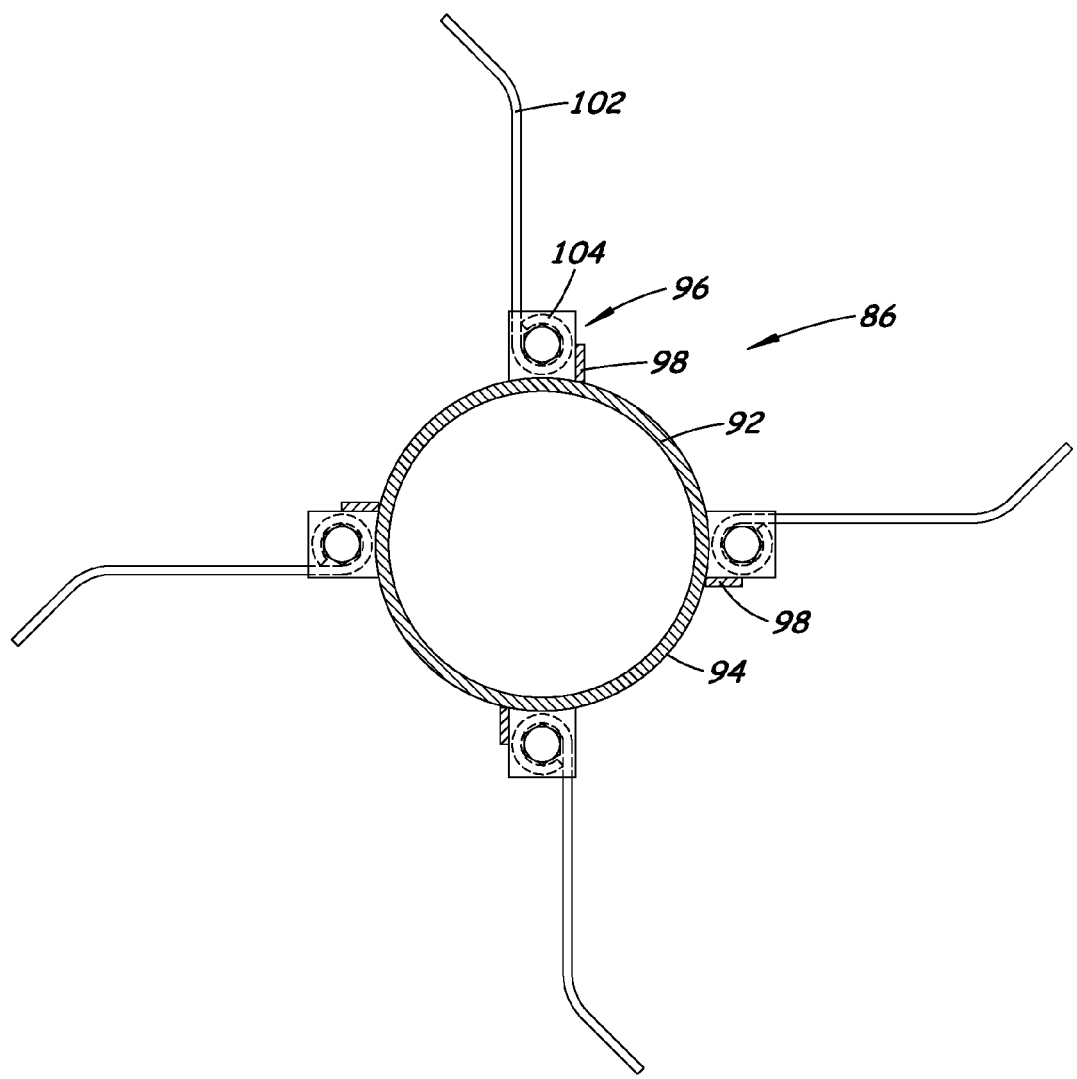
FIG. 4 is a schematic side sectional view of the shredding rotor of the bale shredder, according to an illustrative embodiment.
Figure 5:
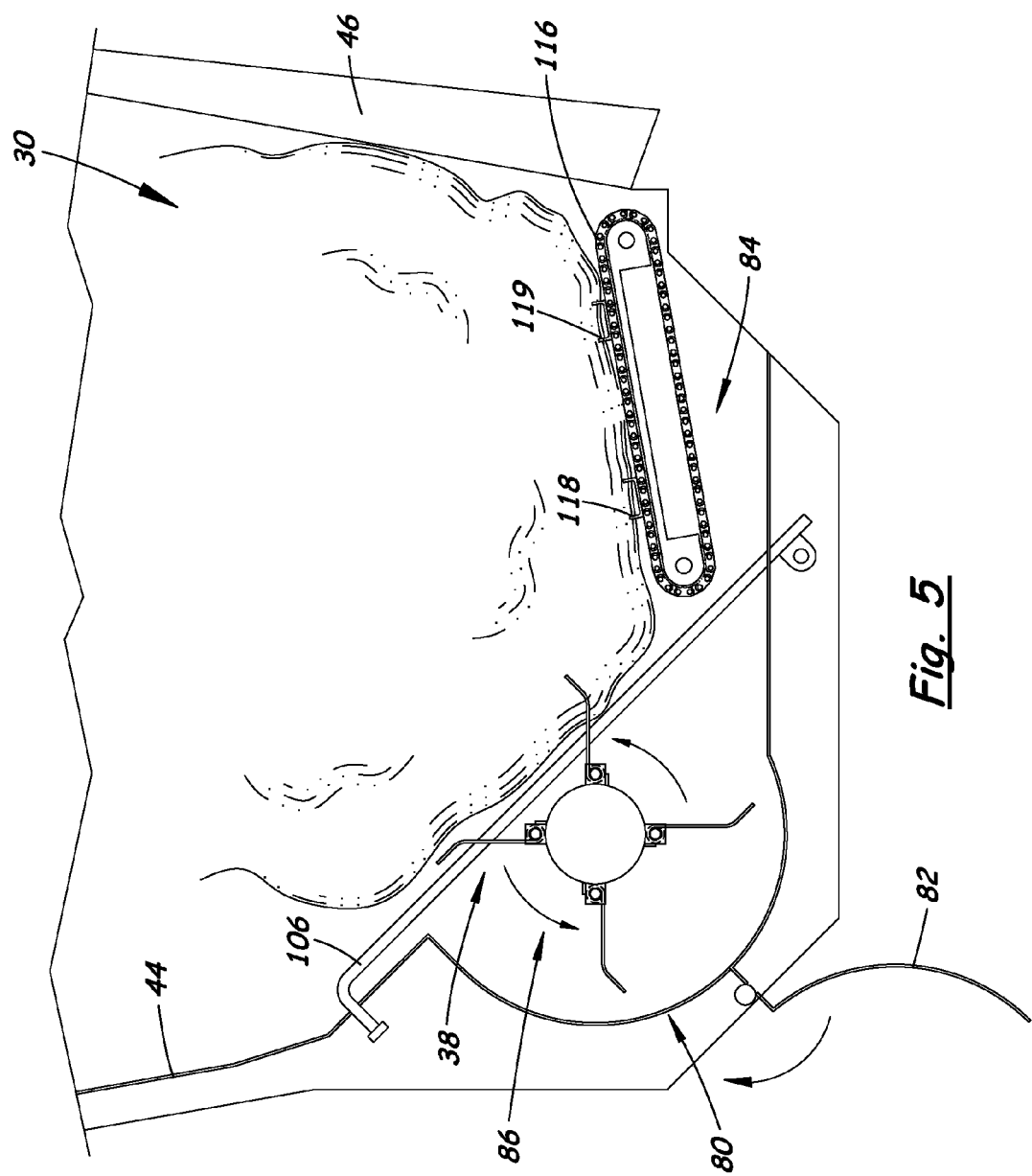
FIG. 5 is a schematic sectional view of the bottom of the bale chamber of the bale shredder, according to an illustrative embodiment.
Figure 6:
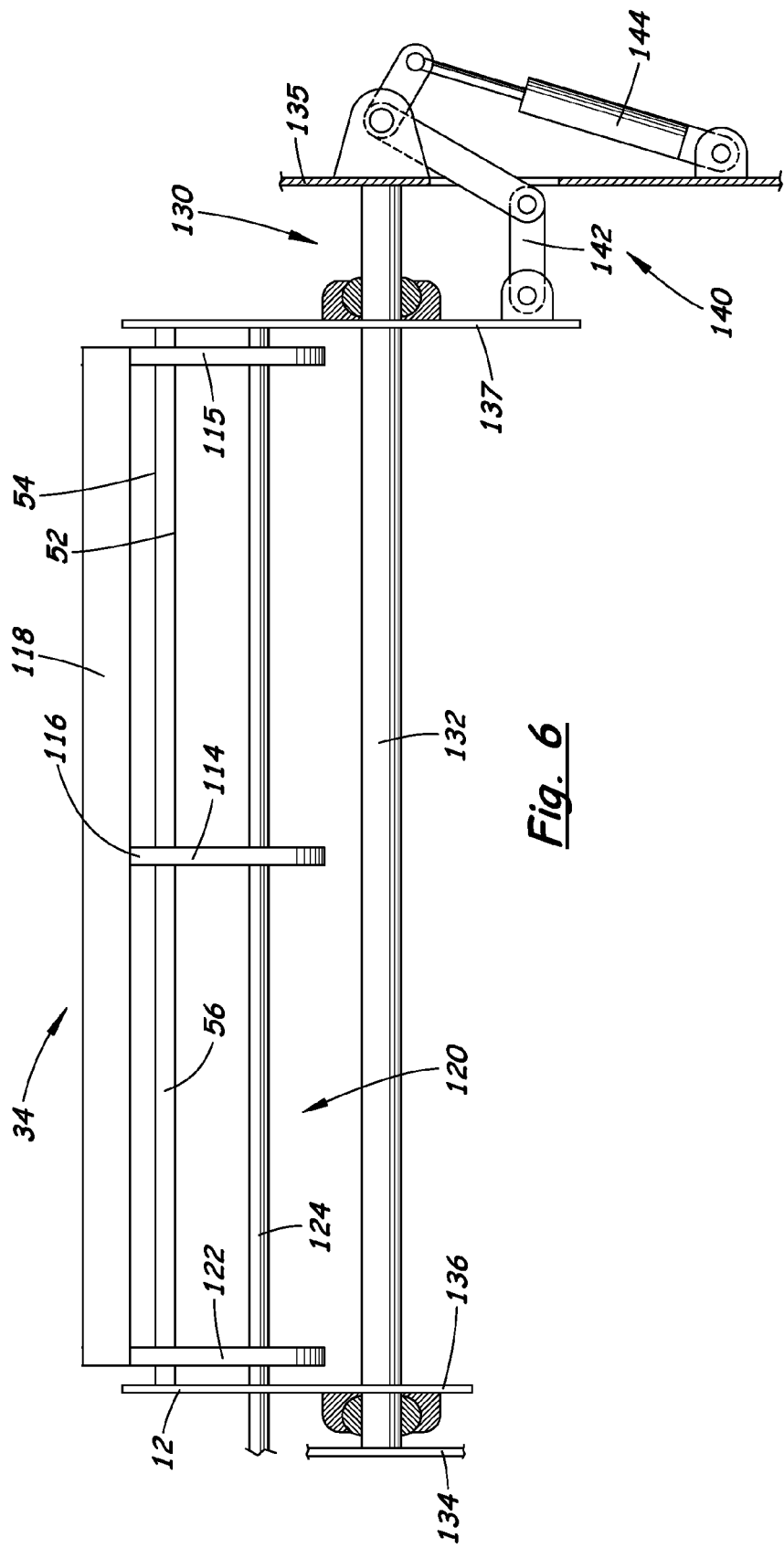
FIG. 6 is a schematic sectional view of the floor structure of the bale shredder showing details of the primary and secondary bale movement assemblies.

The bale shredder 10 may also include a bale shredding assembly 74 that is configured to shred a bale positioned in the bale chamber 30 (see FIGS. 2 through 4). The bale shredding assembly 74 may include a rotor chamber 76 that is in communication with the bale chamber through the bale feed opening 38. The rotor chamber 76 may have a pair of end walls 78 positioned at ends of the rotor chamber. The rotor chamber 76 may have an access opening 80 which may be located substantially opposite of the bale feed opening. The rotor chamber 76 may include a cover panel 82 mounted to move between a closed position over the access opening and an open position away from the access opening and permitting access to the interior of the rotor chamber. The rotor chamber may also have an outlet opening 84 through which material from the bale is moved when it is dispensed.

The bale shredding assembly 74 may further include a shredding rotor 86 that is positioned with respect to the bale chamber 30 to contact a bale in the bale chamber through the bale feed opening. The rotor 86 may be rotatable about a rotation axis, which may be substantially horizontal. The rotor has opposite ends 90, 91 that are mounted on the frame 12. The shredding rotor 86 is positioned in the rotor chamber, and may extend through the end walls 78 of the rotor chamber. The shredding rotor 86 may have a rotor wall 92 with an outer surface 94. The outer surface 94 may be substantially cylindrical in shape, although this is not critical, and may be formed of a sheet metal.

In some highly advantageous embodiments, the shredding rotor 86 may include at least one brace 96 positioned on the rotor wall 92. The brace 96 may be attached to the outer surface 94 of the rotor wall and may extend longitudinally of the rotor wall to the opposite ends 90, 91 of the rotor. In some of the most preferred embodiments, a plurality of the braces 96 are mounted on the rotor wall, and may specifically include four braces. Illustratively, the brace or braces 96 may be formed of an elongate plate with a leg 98 being mounted on the rotor wall 92 and extending outwardly from the wall. The brace 96 may provide advantages such as reinforcing the material of the rotor wall 92, so that relatively thinner material may be utilized for the wall, and may provide a stronger mounting point for the flails 102 described below. The number of braces utilized on the rotor may vary depending upon factors such as the cross sectional size of the rotor, the number of rows of flails utilized, and the like. In some of the most preferred embodiments, the rotor includes three to six braces, although more or fewer may be utilized.

The shredding rotor may also include at least one string blocking member 100 mounted on the shredding rotor to block migration of string along the rotor 86 and past the end walls 78 of the rotor chamber and into a supporting bushing or bearing for the rotor. The string blocking member 100 may extend outwardly with respect to the rotor wall 92 and the outer surface 94 thereof. Preferably but not critically, a string blocking member may be positioned toward the opposite ends 90, 91 of the rotor. In some of the most preferred embodiments, the string blocking member comprises a flange extending substantially continuously about substantially the entire circumference of the rotor wall. The flange may be annular in shape, and may have a substantially circular outer perimeter. The flanges may be positioned between the end walls of the rotor chamber with each flange being positioned adjacent (and in some embodiments close) to one of the end walls.

The shredding rotor 86 may also comprise a plurality of flails 102 that are mounted on the shredding rotor 86, and may be configured to extend from the rotor through the bale feed opening to contact a bale in the bale chamber. The flails may be pivotally mounted on the rotor. In some of the most preferred embodiments, the flails 102 may be mounted on the rotor wall 92 and on one of the braces 96. Each of the flails 102 may be pivotally mounted on a pair of mounting tabs 104, 105, with each of the mounting tabs having one edge being mounted on the rotor wall 92 and having another edge mounted on one of the braces 96, such as on the second leg 99 of the brace. The flails 102 may be elongated and at least a portion of a length of the flails may be arcuate in shape.

A plurality of bale positioning members 106 may extend across the bale feed opening 38. The degree of protrusion of the bale positioning members 106 from the bale feed opening and into the bale chamber may be adjustable to adjust a degree of exposure or contact of a bale in the chamber to the flails 102 of the shredding rotor. Each of the bale positioning members may have an inboard end 108 and an outboard end 109, with portions of the bale positioning members toward the outboard ends extending through apertures 110 in the primary side wall of the perimeter. The outboard ends 109 of the members may be linked together outside of the bale chamber. The inboard ends of the bale positioning members may also be linked together, and a positioning actuator may be connected to at least one of the bale positioning members to move the bale positioning members and adjust the degree of protrusion. The positioning actuator may comprise a hydraulic actuator, although this is not critical.

The bale shredder 10 may also include a primary bale movement assembly 112 that is configured to move a bale in the bale chamber toward the shredding rotor of the bale shredding apparatus. In some embodiments, the primary bale shredding assembly may comprise at least two endless belts 114, 115 with at least an upper section 116 of each belt moving over the upper surface 54 of the floor. The belts 114, 115 extend generally transverse to the rotation axis of the shredding rotor, and the upper section 116 of the belts may extend from adjacent to the secondary side wall 46 to adjacent to the bale feed opening 38. The upper section 116 may extend from the first side 56 to the second side 58 of the upper surface of the floor. In the illustrative embodiment, three of the endless belts, with one belt 114 being positioned toward the middle of the floor and the other two belts 115 being positioned laterally away from the central belt 114.

The primary bale movement assembly 112 may further comprise at least one slat 118 that is movable by the endless belt or belts. The slat 118 may extend transverse to the upper section 116 of the endless belts, and may extend parallel to the rotation of the axis of the shredding rotor. The slat 118 may be mounted on the belts. The primary bale movement assembly 112 may include at least two slats 118, 119, although more slats may be included. In some of the most preferred embodiments, the endless belts and slats may be configured such that only two of the slats are positioned adjacent to the upper surface 54 of the floor at any one time. The resultant spacing between the slats increases the sag of the bale between the slats so that the bale is more likely to contact the upper surface 54 of the floor, and increase the purchase or "bite" that the slats are able to have on the bale as the weight of the bale presses the bale surface down toward the floor. In the case of bales that have a rigid surface due to, for example, containing frozen water, the slats are better able to grab and move the bale even if the ability to sink the slat into the surface of the bale is limited.

A movement structure 120 may be included in the primary bale movement assembly 112 to move the endless belts and the slats over the upper surface of the floor. Illustratively, the movement structure may comprise a sprocket 122 engaging the at least one endless belt 114, 115 and the sprocket may be mounted on a drive shaft 124. The drive shaft may be rotated by, for example, a hydraulic motor connected to, for example, the hydraulic system of the towing vehicle.

The bale shredder 10 may also include a secondary bale movement assembly 130 that is configured to move a bale in the bale chamber in a direction that is substantially transverse to the direction that the bale is moved by the primary bale movement assembly 112. The secondary bale movement assembly 130 may be configured to move the primary bale movement assembly 112 in a direction parallel to the rotation axis of the shredding rotor. The secondary bale movement assembly 130 may be configured to move the primary bale movement structure 120, such as the endless belts and the slats, in a direction that is substantially parallel to the rotation axis of the shredding rotor. The secondary bale movement assembly may be configured to also move the floor 52 in a direction parallel to the rotation axis of the shredding rotor. The secondary bale movement assembly may move the elements in an oscillating or back-and-forth manner which tends to disrupt any continual alignment of the bale with the bale positioning members so ridges on the surface of the bale are less likely to be formed.

The movement caused by the secondary movement assembly may be accomplished in many ways, and the following illustrative embodiment discloses but one way of accomplishing the desired movement. In order to permit the floor 52 to move, the floor may be mounted on one or more support shafts 132 that are substantially fixedly mounted on the frame 12, such as on bulkhead walls 134, 135 that may be positioned on either side of the floor. The floor 52 may have support walls 136, 137 that extend downwardly with respect to the upper surface 54, and gimbal mounts 138, 139 may be mounted on the support walls. The support shaft 132 may extend through the gimbal mounts so that the floor is substantially free to move along the support shafts with minimal resistance. The floor may thus be able to move with respect to and between the bulkhead walls.

The secondary bale movement assembly 130 may comprise a shifting structure 140 that is configured to shift the floor 52 on the support shafts 132 with respect to the frame 12. The shifting structure 140 may be connected to the floor, and may reciprocate to shift a position of the floor with respect to the frame. Illustratively, a linkage 142 may connect the frame and the floor, such as for example the bulkhead wall 135 and the support wall 137. The linkage 142 may be made effectively longer and shorter by movement of a linkage actuator 144, which may be a hydraulic ram and cylinder that acts on the linkage 142.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bale shredder apparatus comprising:
   a frame having a front and a rear with a longitudinal axis extending from the front to the rear and aligning with a direction of movement of the frame when being towed across a ground surface, the frame having lateral sides;
   a bale hopper mounted on the frame and defining an interior bale chamber for receiving a bale to be shredded, the bale hopper having an upper opening into the bale chamber and a chamber bottom positioned opposite of the upper opening, the bale hopper comprising a perimeter formed of walls, a bale feed opening being positioned in one of the walls;
   a bale shredding assembly to shred a bale positioned in the bale chamber, the bale shredding assembly including a shredding rotor positioned adjacent to the bale feed opening to contact a bale in the bale chamber, the rotor having a length, the rotor being rotatable about a rotation axis, the shredding rotor having a rotor wall with an outer surface and a plurality of flails extendable outwardly from the outer surface; and
   wherein the shredding rotor includes at least one brace positioned on the outer surface of the rotor wall and extending substantially parallel to the rotation axis along substantially an entirety of the length of the rotor, the brace including at least one leg extending outwardly from the outer surface of the rotor.

2. The apparatus of claim 1 wherein the at least one leg of the at least one brace protrudes with respect to the outer surface of the shredding rotor to create a gap between twine and the outer surface of the shredding rotor when twine becomes wrapped about the rotor in a plane substantially perpendicular to the rotation axis.

3. The apparatus of claim 1 wherein the outer surface of the rotor is substantially cylindrical in shape.

4. The apparatus of claim 1 wherein the shredding rotor includes a plurality of the braces at substantially uniform spacings about the outer surface.

5. The apparatus of claim 1 wherein the at least one leg of the at least one brace extends substantially perpendicular to the outer surface of the rotor wall at a location of the leg.

6. The apparatus of claim 1 wherein the shredding rotor includes at least one string blocking member mounted on the shredding rotor and configured to block migration of string along the rotor and past ends of the rotor.

7. The apparatus of claim 6 wherein the at least one string blocking member comprises a flange extending substantially continuously about substantially an entire circumference of the rotor wall.

8. The apparatus of claim 1 wherein the at least one brace extends longitudinally of the rotor to opposite ends of the rotor.

9. The apparatus of claim 1 wherein the shredding rotor includes three to six braces positioned on the outer surface of the rotor wall.

10. The apparatus of claim 1 wherein the shredding rotor includes four braces positioned on the outer surface of the rotor wall.

11. The apparatus of claim 1 wherein the at least one brace includes a leg extending outwardly from the rotor wall in an orientation substantially perpendicular to the outer surface of the rotor.

12. The apparatus of claim 1 wherein the shredding rotor includes a plurality of braces and a plurality of flails, each of the flails being at least partially mounted on one of the braces.

13. The apparatus of claim 1 wherein the bale hopper comprises a perimeter formed of walls, the perimeter including a front wall positioned toward the front of the frame, a primary side wall on one lateral side of the bale chamber and extending rearwardly from the front wall, a secondary side wall positioned on an opposite lateral side of the bale chamber from the primary side wall and extending rearwardly from the front wall, a bale feed opening being positioned in the primary side wall; and
   wherein the secondary side wall is movable away from the primary side wall to permit removal of a bale from the bale chamber.

14. The apparatus of claim 13 wherein the secondary side wall is movable between a closed position and an open position.

15. The apparatus of claim 14 wherein the closed position is characterized by the secondary side wall being oriented substantially parallel to the primary side wall and the open position is characterized by the secondary side wall being pivoted out of the closed position and away from the primary side wall.

16. The apparatus of claim 13 wherein the secondary side wall being pivotable about a substantially vertical axis.

17. The apparatus of claim 1 additionally comprising a primary bale movement assembly configured to move a bale in the bale chamber over the upper surface of the floor in a direction substantially perpendicular to a rotational axis of the shredding rotor; and
   a secondary bale movement assembly configured to move a bale in the bale chamber over the upper surface of the floor in a direction substantially parallel to the rotational axis of the shredding rotor.

* * * * *